Figure 1:
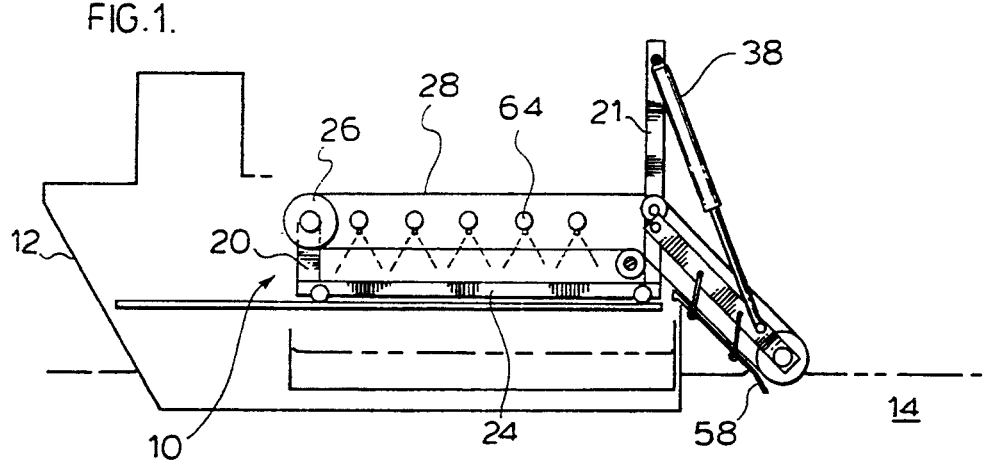

United States Patent [19]
Hines

[11] Patent Number: 5,399,054
[45] Date of Patent: Mar. 21, 1995

[54] OIL RECOVERY APPARATUS

[75] Inventor: David W. Hines, Port Colborne, Canada

[73] Assignee: Environmental Recovery Equipment Inc., Port Colborne, Canada

[21] Appl. No.: 57,777

[22] Filed: May 6, 1993

Related U.S. Application Data

[63] Continuation-in-part of Ser. No. 738,686, Jul. 31, 1991, abandoned.

[51] Int. Cl.⁶ .............................................. E02B 15/10
[52] U.S. Cl. ............................... 414/137.7; 210/242.3; 210/923
[58] Field of Search ................ 210/242.2, 242.3, 923, 210/924; 414/137.7, 142.1

[56] References Cited

U.S. PATENT DOCUMENTS

| | | | |
|---|---|---|---|
| 3,726,406 | 4/1973 | Damberger | 210/923 X |
| 3,732,161 | 5/1973 | Grutsch et al. | 210/923 X |
| 4,138,340 | 2/1979 | Suzuki et al. | 210/923 X |
| 4,341,637 | 7/1982 | Smith | 210/924 X |
| 4,485,013 | 11/1984 | Cockman | 210/923 X |

OTHER PUBLICATIONS

Copies of these references were supplied during the prosecution of parent application Ser. No. 738,686.

*Primary Examiner*—Michael S. Huppert
*Assistant Examiner*—Janice L. Krizek

[57] ABSTRACT

Oil recovery apparatus uses an open mesh conveyor designed to slope from a vessel into the water and to run with its lower flight travelling inboard while sliding on a flat bottomed trough. A container receives the liquid from the upper end of the trough.

15 Claims, 4 Drawing Sheets

OIL RECOVERY APPARATUS

This application is a continuation-in-part of application Ser. No. 07/738,686, filed Jul. 31, 1991, now abandoned.

This invention relates to oil recovery apparatus for removing oil from the surface of a lake, ocean or other body of water.

The invention provides, in one aspect, an endless conveyor composed of wire mesh screening which in operative position on a vessel comprises an upper and a lower flight. The conveyor and its flights have: an inboard section over the vessel which may, but need not necessarily, be parallel to the vessel's deck; and an outboard section adapted to be oriented to extend outwardly, downwardly, from the inboard section to a location where the lower-most part of the conveyor will break the surface of the water and an oil film floating thereon. The conveyor is composed of an open mesh and driven at its inboard end so that the lower flight moves inboard from its outboard end. A flat bottomed trough is arranged so that its bottom contacts the lower surface of the open mesh from an outboard point beneath the surface of the water and of any oil, to a point on the outboard section just short of its transition to the inboard section. The conveyor mesh is selected to provide a surface perpendicular to the conveyor travel direction bordered on each side by walls extending forwardly from the transverse wall parallel to such travel. The perpendicular walls, in combination with the trough bottom act as paddles or dams to move the water and oil up the conveyor slope. The parallel walls tend to keep such rising water and oil in individual cavities. It should be pointed out that some water and oil may escape out of the cavities or under or around the paddles. However, the presence of the paddles and cavities is found to contribute to the efficiency of the oil removal process. (The 'cavities' herein are three sided with the transverse wall and two side walls extending forwardly, in the conveyor travel direction from the transverse wall. The upwardly sloping trough bottom may be considered as serving the function of a fourth wall.) A container or suitable receiving means, is located beneath the upper edge of the trough to receive oil or oil and water carried up by the mesh of the lower conveyor flight.

The result is that oil and water from the surface of the water body is carried up by the conveyor mesh to be deposited in the container. This is believed to be one of the more efficient methods of oil removal. To an extent varying with the viscosity and density of the oil and possibly also with screen parameters, some water is squeezed out of the oil-water mixtures, and runs down over the top of the inwardly rising lower flight to flow over the sides of the trough and into the water body. The reason for this is not clearly understood, but it does occur, and the oil separation process is assisted thereby.

In another aspect of the invention, the open mesh screen of the lower flight, in its inboard travel over the inboard section is subjected to the direct application of steam jets to clean the conveyor of oil.

Applicant is aware of the following prior U.S. Pat. Nos.:

| | |
|---|---|
| Cockman | 4,485,013 |
| Suzuki et al. | 4,138,340 |
| Smith | 4,341,637 |
| Damberger | 3,726,406 |
| Grutsch et al. | 3,732,161 |

Although these patents all relate to the art of separating contaminants from water, and the first three patents show the use of open screens, they do not show the ascent of water by the sliding cooperation of the lower flight of an open mesh conveyor and a flat trough. Although the Smith patent shows the use of steam in a heat exchanger, it does not show the direct application of steam to a mesh screen for cleaning the latter.

Figure 2:
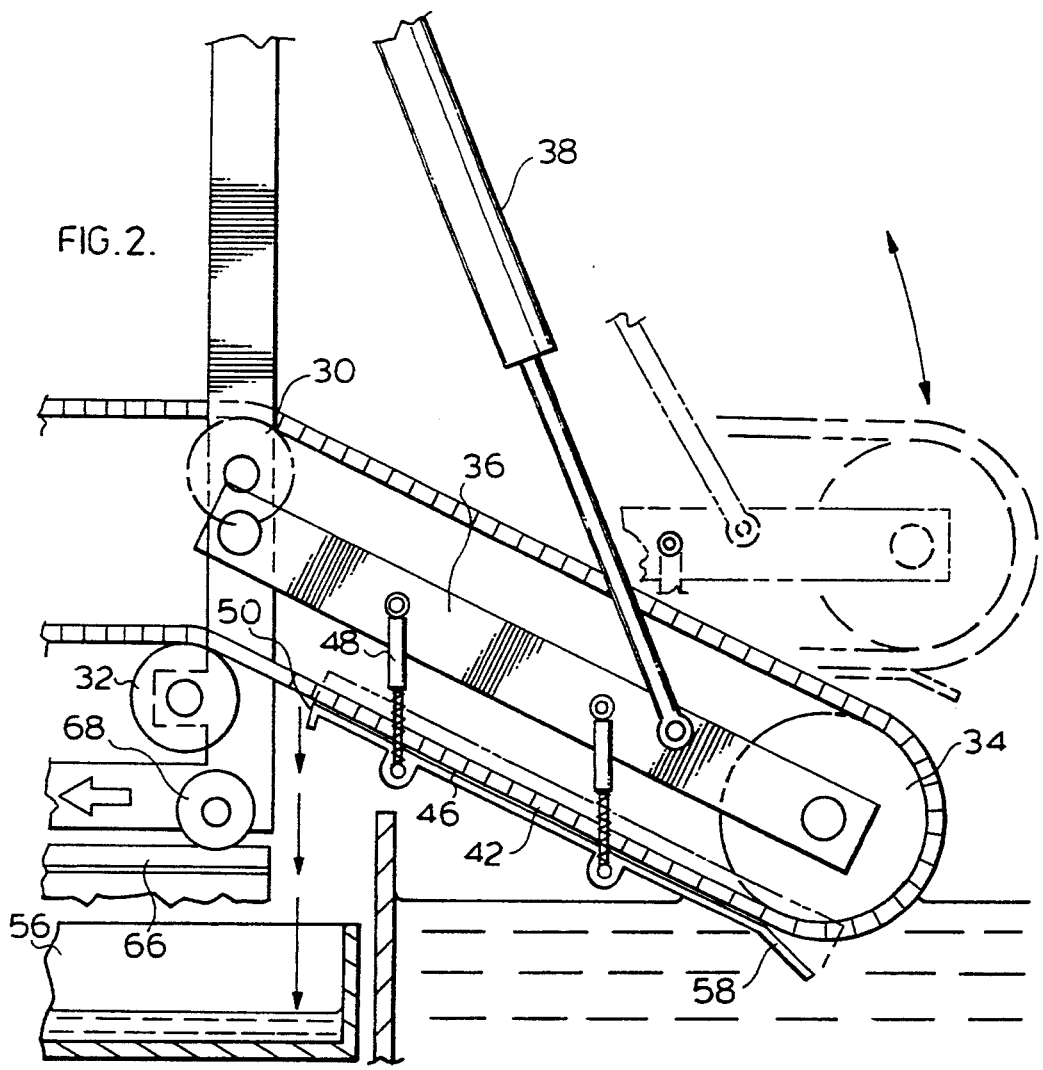
Figure 3:
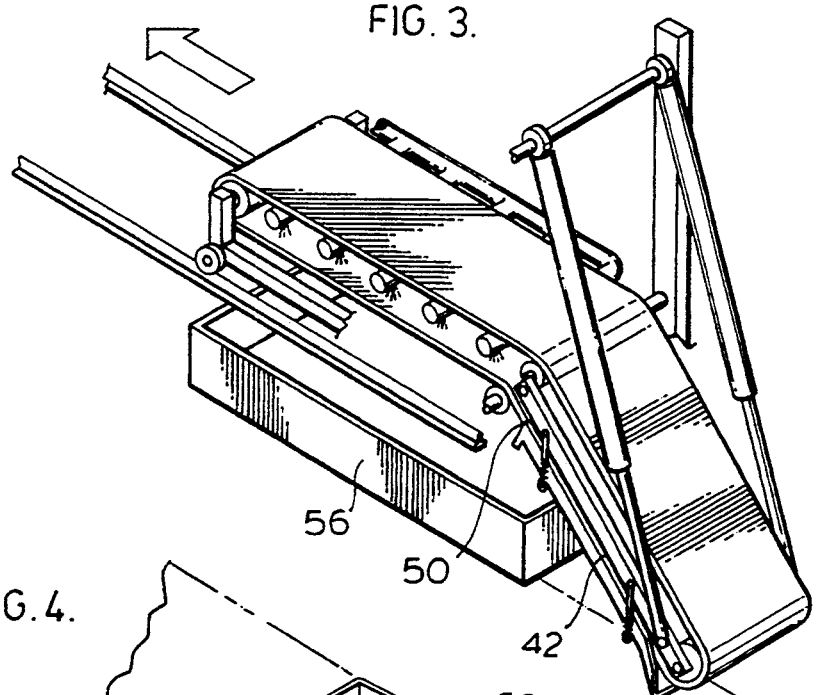
Figure 4:
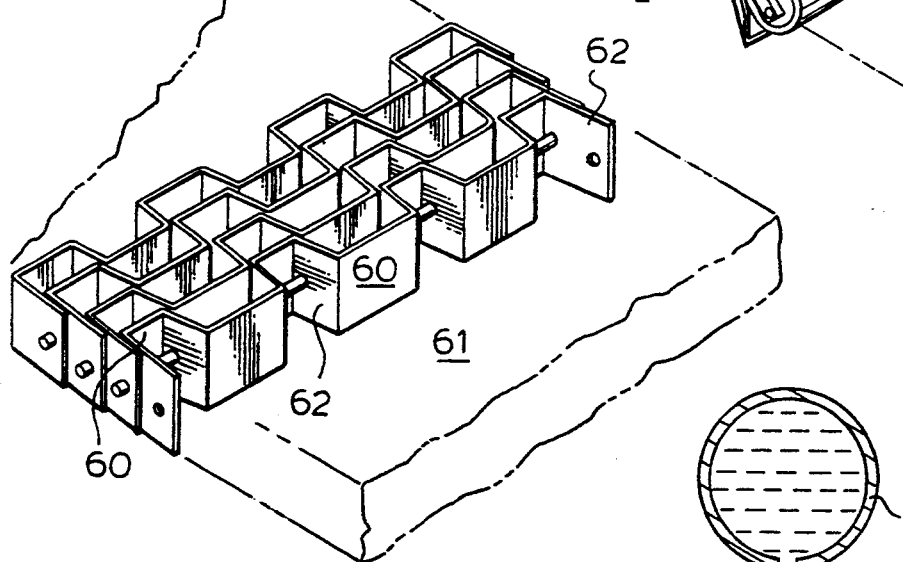
Figure 5:
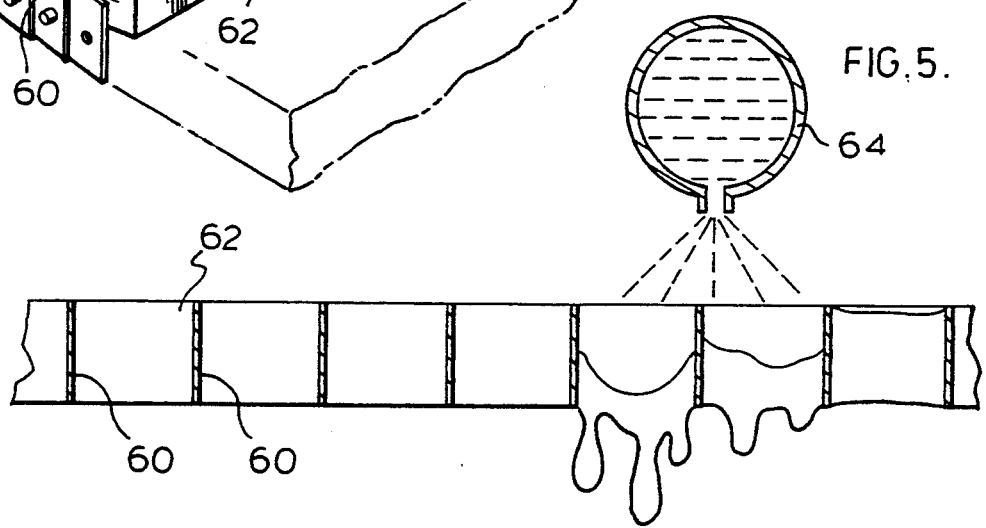
Figure 6:
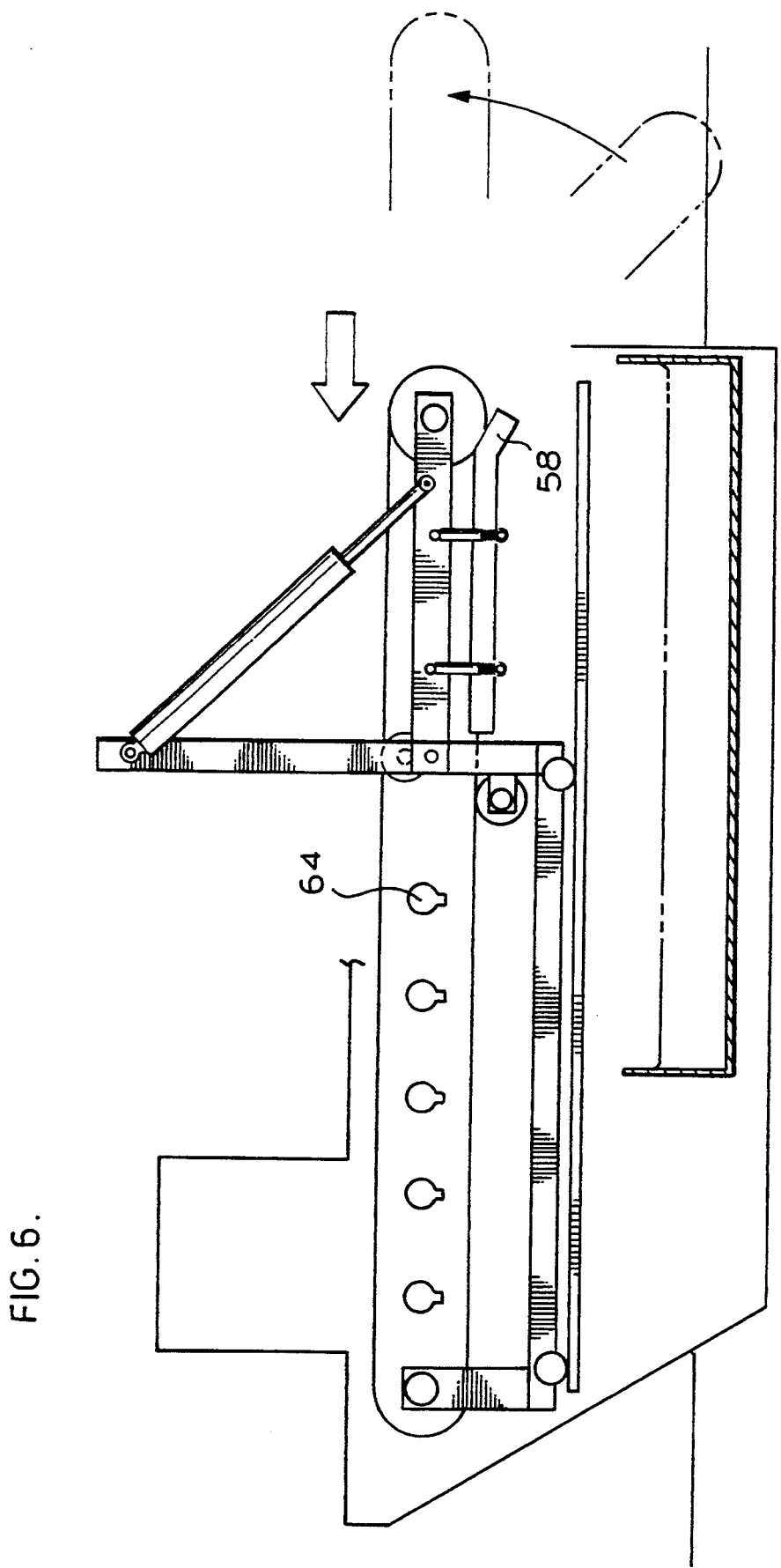
Figure 7:
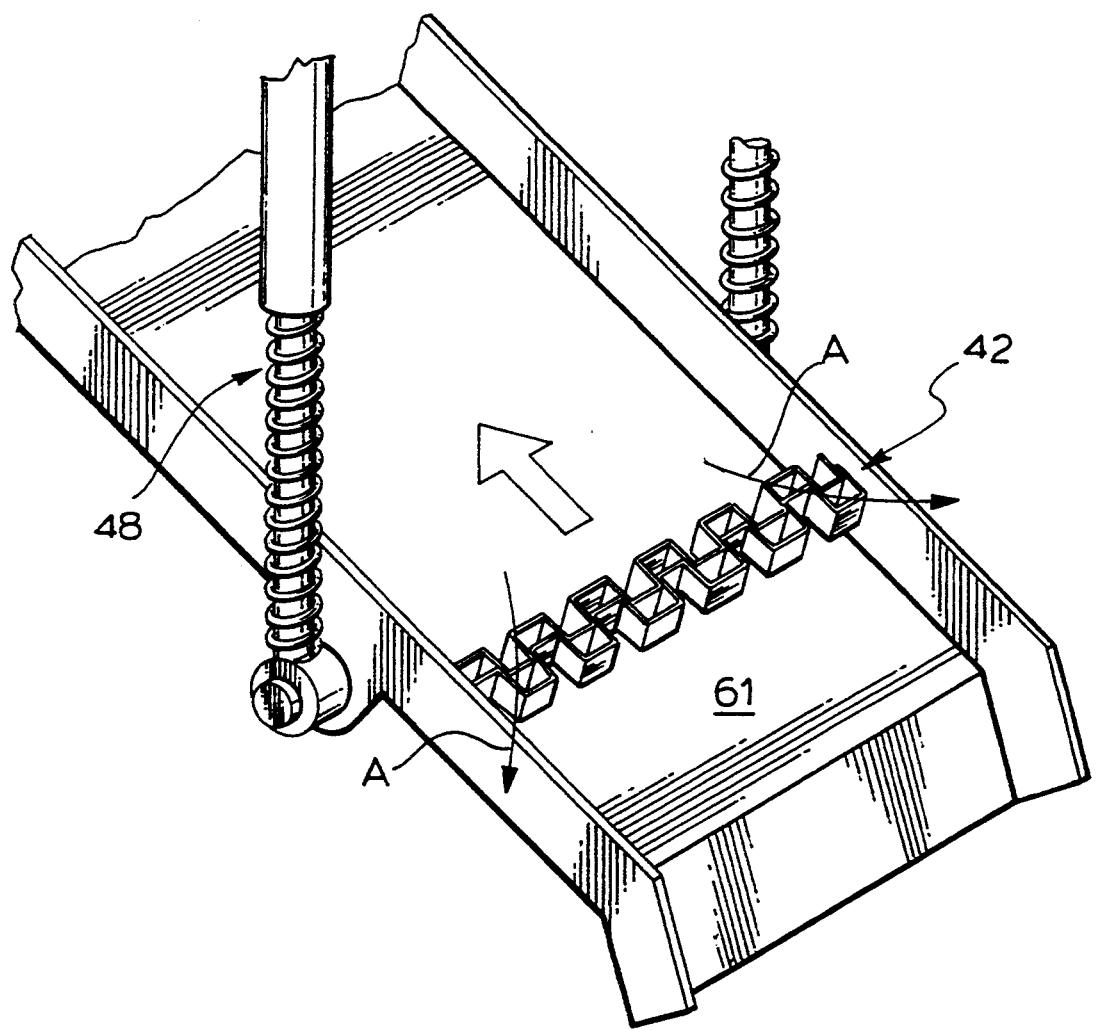

In drawings which illustrate a preferred embodiment of the invention:

FIG. 1 is a schematic side view of the invention in its operative attitude for oil removal, FIG. 2 is an enlarged view of some of the inventive mechanism, indicating the mechanism for raising and lowering the outboard section of the conveyor, FIG. 3 is a perspective somewhat schematic view of components of the invention in operative extended position, with the vessel omitted, FIG. 4 is a more detailed view of the conveyor chain, FIG. 5 is an enlarged view of a portion of the conveyor chain showing the action of steam cleaning jets, FIG. 6 shows schematically the conveyor in retracted position, and FIG. 7 is intended to demonstrate back-flow of liquid off the conveyor.

In FIG. 1 there is illustrated a rigidly connected frame 10 mounted on the deck of a vessel 12 which is floating on a body of water 14. It will be assumed that the surface of water 14 carries an upper layer of oil (not separately illustrated) which it is desired to remove.

The frame 10 includes uprights 20 and 21 transverse members and longitudinally extending members 24 rigidly connected with each other. The frame is mounted by means shown, only schematically, to move between extended and retracted positions as hereafter described.

The frame mounts a rotatable conveyor drive drum 26, driven by means not shown, to support the inboard end of a conveyor belt 28. A pair of idler support rollers 30 and 32 are mounted on uprights 21 to respectively support the upper and lower flights of the belt. A drum 34 rotatably supports the outboard end of the belt. Drum 34 is supported by arms 36 pivoted on uprights 21 and the location of drum 34 is controlled by a pair of co-acting two way hydraulic rams 38 which are connected at their upper ends to respective uprights 21 and at their lower extents to mount the shaft for drum 34. Thus by use of the hydraulic rams, the outer end of the conveyor may, in operative attitude be located just beneath the surface of the water and its oil layer; (known herein as the 'extended' position) or in a horizontal attitude. In the horizontal attitude, conveyor and frame may be moved inboard, called herein the retracted or inoperative position.

The description hereafter will however be concerned with the extended, operative position.

A flat bottomed trough 46 is suspended from bar by adjustable length spring biased links 48. The links 48 are each pivotally connected to arm 36 and trough 46 to pivot about horizontal axes perpendicular to the trough direction at the upstream and downstream end of the trough so that in effect a parallel linkage is provided. The linkage is made adjustable to bias the trough upwardly so that in the desired attitude of the conveyor the flat bottom of the trough will slidingly contact the bottom surface of lower flight 42 of the conveyor. The links are adjustable and biased in the shortening direction, such adjustment must be made for a range of outboard conveyor section attitudes.

The upper edge 50 of the trough 46 is located to be over receiving means, here a tank 56 whereby oil or an oil water mixture carried up by the conveyor may draw from the conveyor lower flight into tank 56 for removal to any convenient storage means.

The lower end of the trough is angled (and could be curved) to form a downward extent 58 to clear the outboard end of the lower flight at the turn of the conveyor about drum 34, so that the lower surface of the conveyor is in full contact with the water and oil forming part of body of liquid 14.

The conveyor is an open mesh screen. It provides surface 60 running transverse to the conveyor direction and perpendicular to the trough bottom 61 and acts as a plough or dam and carries water and oil up the conveyor slope. The conveyor mesh also provides surfaces 62 parallel to the direction of conveyor travel and perpendicular to the trough bottom and which tend, with surfaces 60 to form upwardly facing cavities for the water and oil. Such cavities need not be in a square array but may be staggered in other conveyor arrangements. It should be clearly understood that some leakage under surfaces 60 and 62 is expected and, in some mesh arrangements there may be leakage between surfaces 60 and 62. However, the cavity effect does move a substantial proportion of the water and oil up the trough. Instead of the preferred surfaces 60 and 62 parallel and perpendicular to the conveyor direction pairs of surfaces each diagonal relative to the conveyor direction may define cavities open upwardly but also facing in the conveyor travel direction so that the lower surface of the conveyor is in full contact with the water and oil, forming part of body of liquid 14.

In the operation of the screen, the upwardly facing surface (and to some extent the sideward facing surfaces) of the mesh members act as dams and cavity dividers as they slide on the trough bottom and cause a large proportion of the entrapped water and oil to be conveyed to upper trough edge 50 where it runs into container 56 for disposal, or further separation. It is noted that, in extents varying with the oil viscosity and density, a further phenomena takes place. As the water-oil mixture is conveyed upward by the conveyor the water (or a higher percentage of water than in that being conveyed) is moved or squeezed upwardly from the mesh cavities and, running over the cavity walls, runs down along the upper surface of the rising lower flight. The downwardly running 'higher proportion' water eventually reaches the water body surface and flows over the side walls of the trough into the surrounding water body as indicated by the arrows A of FIG. 7. The removal of this higher percentage water during the upward travel of the water-oil mixture, increases the proportion of oil flowing into container 56, and the efficiency of the process.

The mesh of the container is preferably articulate metal screening with cavities having maximum dimensions of between three quarters of an inch and four inches.

I prefer to use square (or approximately square) cell mesh as shown in FIG. 4 with width and length dimensions of between three quarters of an inch and four inches. The thickness of the flight, and hence of individual cavities which in accord with the invention corresponds to the height of the 'dams' raising the water-oil mixture is preferably between one quarter inch and one and a half inches.

Set out below are presently preferred dimensions for the square screen for the conveyor. However it should be noted that experimentation has not been completed with respect to the effect of differing wave sizes on the screen dimensions which may be used. Moreover research has been more extensive with respect to the 1" square screen sizes than with the higher sizes.

Subject to the above preferred dimensions for the square screen are as follows ('IF'=Intermediate Fuel):

| Oil Type | Mesh | Depth | Width |
| --- | --- | --- | --- |
| IF 350 - IF 30 | 1" Square | $\frac{3}{8}$" | 2' or larger |
| Bunker - IF 350 | 2" Square | $\frac{1}{2}$" | 2' or larger |
| Crude - Bunker | 3" Square | 1" | 2' or larger |

A source of the square mesh screen is: Cambridge Wire Cloth Company, Goodwill Road, P.O. Box 399, Cambridge, Md., U.S.A.

Mounted on the frame 10 between inboard drive drum 26 and the upper and lower idler rollers 30 and 32; and between the inboard upper and lower flights, are steam jets 64, downwardly directed, to cause steam to impact on the mesh and clean from the lower flight mesh sections such water and oil as has not already entered the container 56 at edge 30 or run downward along the top of the mesh screen during the upward travel of the lower flights. The action of the jets is schematically illustrated in FIG. 5.

The vessel is shown, with the conveyor extendable rearwardly from the vessel, as shown in FIG. 6. However, the conveyor and its frame and supporting track may be designed to be directed forwardly or on either side of the vessel.

The frame 10 may be mounted in any conventional manner to move between its retracted and its extended position. As shown schematically units 66 are preferably provided to guide wheels 68 mounted on frame 21 for travel of the latter between extended and retracted position. Means for so moving the frame are conventionally available and are not shown.

In operation then, the frame and conveyor may initially be in the retracted position as shown in FIG. 6. The frame may then be moved so that the outboard section of the conveyor extends over the water as implied by the dotted position of FIG. 2.

Hydraulic rams 38 are then operated to lower the outboard section of the conveyor to the solid line position of FIG. 2 where the outer end of the lower conveyor flight is just below the water 14 surface. Due to the spring loading of links 48 the trough will remain in contact with said lower flight during such lowering of the conveyor outer section. The drive drum 26 is then operated to move the conveyor so that the lower flight brings water and oil upward. Steam jets 64 are operated to clean the lower flight of water and oil which has not come off the lower flight at edge 50 or before, through the 'run-off' at arrows A of FIG. 7. When the operation is complete the jets 64 are turned off, the conveyor is stopped. The outer section is raised and with frame 21 moved inboard.

I claim:

1. Oil recovery apparatus comprising:

a conveyor mountable on a vessel to define generally parallel upper and lower flights, said conveyor comprising an inner section and an outer section, said conveyor being composed of an open mesh, said outer section supported to extend downwardly from the edge of the vessel, means for controlling the angle of said downward extent so that the outer end of said lower flight is submerged in the water about the vessel, means for driving said conveyor in the direction which moves said lower and upper flights in an inboard and an outboard direction, respectively, and thereby defining a travel direction, a flat bottomed trough having a bottom shaped to contact the lower surface of the lower flight in said outer section, means for supporting said trough so that said lower surface slides on said bottom, said bottom defining an upper edge, a container on said vessel located to receive oil flowing over said upper edge.

2. Oil recovery apparatus as claimed in claim 1 including means to apply steam jets directly to the inner section of the lower flight, and wherein said container is located below said lower flight to receive oil detached from said conveyor by said steam jets.

3. Oil recovery apparatus, as claimed in claim 1 wherein said open mesh defines apertures of greater than three quarters of an inch in their major dimension and wherein the members defining said mesh are at least one half inch thick.

4. Oil recovery apparatus, as claimed in claim 2 wherein said open mesh defines apertures of greater than three quarters of an inch in their major dimension and wherein the members defining said mesh are at least one half inch thick.

5. Oil recovery apparatus, as claimed in claim 1 wherein said open mesh defines approximately square apertures of at least three quarter inches width.

6. Oil recovery apparatus, as claimed in claim 2 wherein said open mesh defines approximately square apertures of at least three quarter inches width.

7. Oil recovery apparatus, as claimed in claim 5 wherein said approximately square apertures are less than four inches width.

8. Oil recovery apparatus, as claimed in claim 6 wherein said approximately square apertures are less than four inches width.

9. Oil recovery apparatus as claimed in claim 1 wherein said mesh defines a plurality of cavities having a wall transverse to the travel direction and approximately perpendicular to the trough bottom and a pair of walls extending approximately parallel to the conveyor travel direction and extending in the travel direction from opposite edges of the transverse wall.

10. Oil recovery apparatus as claimed in claim 9 including means to apply steam jets directly to the inner section of the lower flight, and wherein said container is located below said lower flight to receive oil detached from said conveyor by said steam jets.

11. Oil recovery apparatus, as claimed in claim 9 wherein said open mesh defines apertures of greater than three quarters of an inch in their major dimension and wherein the members defining said mesh are at least one half inch thick.

12. Oil recovery apparatus, as claimed in claim 10 wherein said open mesh defines apertures of greater than three quarters of an inch in their major dimension and wherein the members defining said mesh are at least one half inch thick.

13. Oil recovery apparatus, as claimed in claim 9 wherein said open mesh defines approximately square apertures of at least three quarter inches width.

14. Oil recovery apparatus, as claimed in claim 10 wherein said open mesh defines approximately square apertures of at least three quarter inches width.

15. Oil recovery apparatus, as claimed in claim 12 wherein said open mesh defines approximately square apertures of at least three quarter inches width.

* * * * *